(12) United States Patent
Doylend

(10) Patent No.: US 11,353,882 B2
(45) Date of Patent: Jun. 7, 2022

(54) BACK REFLECTION CIRCULATOR IN SILICON PHOTONIC CHIP METHODS AND APPARATUS

(71) Applicant: Intel Corporation, Santa Clara, CA (US)

(72) Inventor: Jonathan K. Doylend, Morga Hill, CA (US)

(73) Assignee: Intel Corporation, Santa Clara, CA (US)

( * ) Notice: Subject to any disclaimer, the term of this patent is extended or adjusted under 35 U.S.C. 154(b) by 896 days.

(21) Appl. No.: 16/145,747

(22) Filed: Sep. 28, 2018

(65) Prior Publication Data

US 2019/0049985 A1 Feb. 14, 2019

(51) Int. Cl.

| | |
|---|---|
| *G05D 1/02* | (2020.01) |
| *G02B 6/27* | (2006.01) |
| *G02B 6/122* | (2006.01) |
| *G02B 6/126* | (2006.01) |
| *G01S 17/88* | (2006.01) |
| *G05D 1/00* | (2006.01) |
| *G01S 7/499* | (2006.01) |
| *G02B 6/42* | (2006.01) |
| *G01S 7/481* | (2006.01) |
| *G01S 7/4911* | (2020.01) |
| *G01S 17/34* | (2020.01) |
| *G01S 17/931* | (2020.01) |
| *G02B 6/12* | (2006.01) |

(52) U.S. Cl.
CPC .......... *G05D 1/0231* (2013.01); *G01S 7/4814* (2013.01); *G01S 7/499* (2013.01); *G01S 7/4911* (2013.01); *G01S 17/34* (2020.01); *G01S 17/88* (2013.01); *G01S 17/931* (2020.01); *G02B 6/126* (2013.01); *G02B 6/1225* (2013.01); *G02B 6/2746* (2013.01); *G02B 6/2766* (2013.01); *G02B 6/2773* (2013.01); *G02B 6/4246* (2013.01); *G05D 1/0088* (2013.01); *G02B 2006/12061* (2013.01)

(58) Field of Classification Search
CPC ..... G05D 1/0231; G02B 6/126; G02B 6/2773
See application file for complete search history.

(56) References Cited

PUBLICATIONS

S. Gao et al., "Frequency-modulated continuous-wave lidar using I/Q modulator for simplified heterodyne detection", Jun. 1, 2012, 3 pages, Optics Letters, vol. 37, No. 11.

(Continued)

*Primary Examiner* — Joseph L Williams
(74) *Attorney, Agent, or Firm* — Schwabe, Williamson & Wyatt, P.C.

(57) ABSTRACT

Apparatuses and methods associated with silicon photonic chips, are disclosed herein. In some embodiments, a quarter wave plate (QWP) is provided to a silicon photonic chip to convert a first linearly polarized mode (e.g., TE mode) optical beam from a laser disposed on the silicon photonic chip, into a combination of orthogonal polarization modes optical beam, and to convert or contribute in converting a reflection of the combined polarized modes optical beam into a second linearly polarized mode (e.g., TM) optical beam with polarization orthogonal to the first. The optical beam is rotated relative to an axis of the QWP, or the QWP and its axis are rotated relative to a polarization axis of the optical beam. Other embodiments are also described and claimed.

21 Claims, 7 Drawing Sheets

(56) References Cited

PUBLICATIONS

Kota Mitsuya et al., "Demonstration of a Silicon Waveguide Optical Circulator", Apr. 15, 2013, 3 pages, IEEE Photonics Technology Letters, vol. 25, No. 8.

Paolo Pintus et al., "Microring-Based Optical Isolator and Circulator with Integrated Electromagnet for Silicon Photonics", Apr. 15, 2017, 9 pages, Journal of Lightwave Technology, vol. 35, No. 8.

Parinaz Aleahmad et al., "Garnet-free optical circulators monolithically integrated on spatially modified III-V quantum wells", 2016, 11 pages, CREOL, The College of Optics and Photonics, University of Central Florida, Orlando, Florida 32816, USA.

Li Liu et al., "On-chip passive three-port circuit of all-optical ordered-route transmission", 2015, 9 pages.

Hao Wu et al., "Ultra-broadband high-performance polarizing beam splitter on silicon", Mar. 20, 2017, 7 pages, Optic Express 6069, vol. 25, No. 6.

Wesley D. Sacher et al., "Polraziation rotator-splitters in standard active silicon photonics platforms", 2014, 10 pages, Optical Society of America.

Yao Liang et al., "Integratable quarter-wave plates enable one-way angular momentum conversion", 2016, 8 pages.

BACK REFLECTION CIRCULATOR IN SILICON PHOTONIC CHIP METHODS AND APPARATUS

TECHNICAL FIELD

The present disclosure relates to the fields of silicon photonics. More particularly, the present disclosure relates to a means of achieving on-chip silicon photonic protection to back-reflected signals, having particular application to computer-assisted or autonomous driving (CA/AD) vehicles.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Silicon photonic chips for both optical interconnects and LIDAR (Light Detection and Ranging) use on-chip lasers as optical sources for digital transmission. The signal quality in these applications depends strongly on the spectral quality of the laser output, which is adversely affected by back-reflected light into the laser. Light reflected into the laser causes an increase in amplitude and phase-noise within the laser, which can lead to increased linewidth and eventual coherence collapse. This is of particular concern in LIDAR using FMCW (Frequency Modulated Continuous Wave) techniques in which coherent mixing of the laser output with the returned optical echo is used to determine the range to the target. In such a system, increased linewidth of the laser (i.e. degraded laser spectral purity) reduces the accuracy with which the range can be determined, and increases limitations on the detection range due to the impact on the laser's coherence length. The reduction in accuracy and the increase in limitation is of significant concern in certain safety sensitive applications, such as CA/AD vehicles. In these applications, it is imperative that the laser be protected from back-reflected light in order to preserve its linewidth and hence the ranging accuracy of the system. Furthermore, in LIDAR systems it may be advantageous to use the same optical component to launch the outgoing signal as to collect the incoming reflection from the target, and in this case it is useful to be able to route the returning signal through a circulator so as to keep it or part of it from being lost by returning to the laser.

Some traditional techniques to separate outgoing from back-reflected light (i.e. optical isolators and circulators) have relied on the integration of both magnets and materials with strong magnetooptic coefficients—neither of which are readily compatible with the standard complementary metal-oxide semiconductor (CMOS) processing used in silicon photonics and which renders silicon photonics advantageous for optical integration. Other techniques have used nonlinear gain elements, relying on both the incorporation of dedicated active components for the optical circulator but also the injection of electrical power to provide gain. However, these techniques significantly increase the cost and power consumption of the chip. Still other techniques have used thermooptic resonant structures to induce power-dependent index changes. These techniques have the disadvantage of requiring electrical power dissipation to tune the on-chip resonators as well as requiring significant optical absorption of the transmitted beam in order to produce the in-resonator heating which leads to output port selection.

Therefore, the capability to prevent back-reflections from interfering with a laser source and to route back-reflected signals onto a separate path from the laser without the foregoing discussed disadvantages, i.e., without introducing magnetooptic components, without adding gain elements, and without the need for absorption-induced heating, is desired, particularly for laser-noise sensitive applications, such as, in the case of photonic transceivers of LIDAR employed in CA/AD vehicles.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
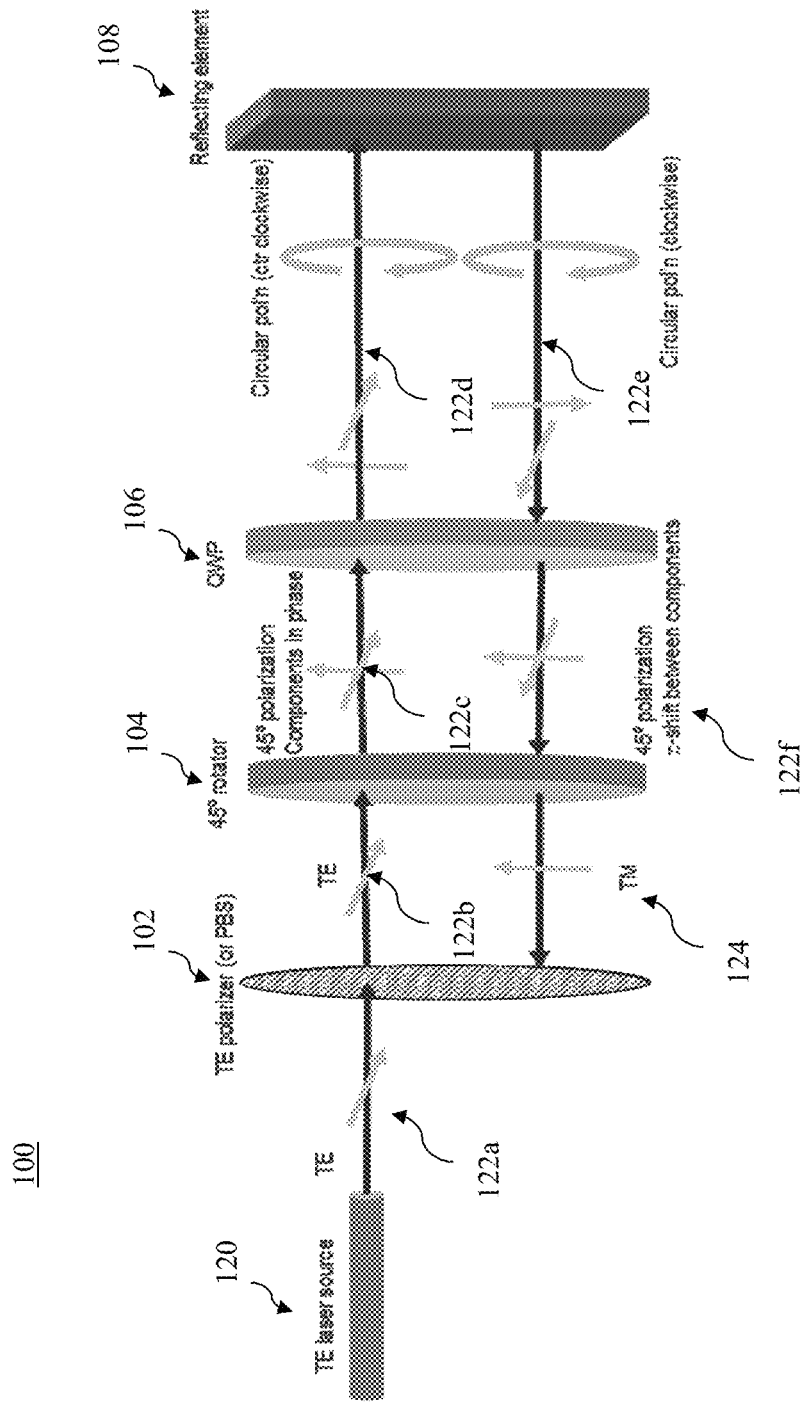
FIG. 1 illustrates a generic example approach to blocking and/or re-routing a back-reflection of an optical beam from interfering with the source laser's output, or vice versa, according to various embodiments.

To address challenges discussed in the background section, apparatuses and methods associated with on-chip silicon photonic chip back reflection protection/circulator technology, are disclosed herein. The on-chip silicon photonic back reflection protection/circulator technology of the present disclosure provides an arrangement to isolate or otherwise protect an on-chip laser source from back-reflected light and to enable re-routing (i.e. circulation) of the back-reflected light to an alternate path for separate signal monitoring, using solely passive on-chip components without the need for the integration of magnetooptic components. In the ensuing descriptions "TE" and "TM" refer to "transverse electric" and "transverse magnetic" polarizations, and should be understood to refer generically to quasi-TE and quasi-TM polarized modes.

In some embodiments, a silicon photonic chip includes a quarter wave plate (QWP). The QWP is used to convert a first linearly polarized optical mode from a laser source disposed on the silicon photonic chip, e.g., a TE mode into quarter-wave shifted TE (or quasi-TE) and TM (or quasi-TM) modes—analogous to a circularly polarized optical beam in bulk media. The QWP is further used to convert or contribute in converting a reflection of this combination of optical modes into an orthogonally polarized returning linearly polarized mode (e.g. TM mode, when the original optical mode is TE), within the silicon photonic chip. The original optical mode can either be pre-converted to TE and TM components relative to the axes of the QWP (before reaching the QWP), or the QWP axes can be disposed such that its axes are rotated (e.g. at 45 degrees) relative to the optical beam's polarization axis. The reflection may be reflected by an on-chip or off-chip reflector.

In some embodiments, the silicon photonic chip further includes a TE/TM converter to receive from the laser, the linearly polarized (e.g. TE) optical mode, and convert the linearly polarized mode to a combination of TE and TM modes. The QWP is optically coupled to the TE/TM converter to receive the combined TE/TM optical beam, and introduce an additional quarter-wave phase shift between the two polarizations, i.e. between the TE and TM modes. The QWP and TE/TM converter are to further cooperate to convert the back-reflection of the quarter-wave shifted TE and TM polarized optical modes to a second linearly polarized optical mode which is orthogonal to that originally emitted by the laser, the first linearly polarized mode optical beam. For example, the second linearly polarized optical mode is TM if the laser emitting the first linearly polarized mode optical beam in TE mode, or vice versa. In some embodiments, the QWP may be integrated with the TE/TM converter rather than being optically coupled to it.

In some embodiments, the TE/TM converter is arranged to receive the first linearly polarized mode (e.g. TE), and convert half the optical power, such that the optical beam now includes both orthogonal polarizations (e.g. both TE and TM) relative to the original optical beam polarization axis, which may be in phase or have a phase delta. The QWP is arranged to introduce an additional relative phase delay to the orthogonally polarized modes, i.e. the TE and TM components introduced into the QWP are phase delayed relative to each other by a quarter wavelength in addition to any phase delay originally between them prior to the QWP. A reflection of the combined TE and TM modes would accordingly be reflected with reversed polarities analogous to the reflection of a circular polarization in bulk optical media in which e.g., clockwise circular polarization would be reflected as counter-clockwise circular polarization, and vice versa. The QWP is arranged to introduce another quarter-wave shift between the reflected TE and TM modes, thus leaving them with a combined π-shift relative to their original phase relationship between orthogonal polarization components, i.e. the original phase relationship which they held when first emitted from the TE/TM converter prior to being reflected. The TE/TM converter is arranged to further convert the linearly polarized reflection such that the returning components being π-shifted generate the linearly polarized optical mode orthogonal to that of the initial linearly polarized mode. In some embodiments, the QWP and TE/TM converter may be combined in a single component rather than being separate components optically coupled to each other. In some embodiments the QWP introduces a different phase delay, i.e. functions as a phase delay between orthogonal modes but not a quarter-wave delay, in order to achieve the optimal phase relation between orthogonal components such that the back-reflected optical modes recombine in the TE/TM converter to produce the orthogonal polarization to that originally launched from the laser.

In some embodiments, the silicon photonic chip further comprises a polarizer (e.g. a TE polarizer) or a polarizing beam splitter (PBS), disposed between the laser and the TE/TM converter. The polarizer or the PBS is arranged to receive and redirect the linearly polarized reflected optical mode (which is orthogonal to that of the original linearly polarized optical mode output by the laser) from the linearly polarized optical mode output by the laser. In this way the device acts as a circulator for back-reflected light by redirecting it to an alternate path from that of the source.

In some embodiments, a transceiver comprises the silicon photonic chip. In some embodiments, a LIDAR of an in-vehicle system of a CA/AD vehicle comprises a transceiver having the silicon photonic chip. For these embodiments, the reflector of the optical beam would be off-chip, typically at a distance from the CA/AD vehicle. In some embodiments, an intra-vehicle communication subsystem of an in-vehicle system of a CA/AD vehicle comprises a transceiver having the silicon photonic chip. For these embodiments, the reflector of the optical beam may be on-chip or off-chip.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings. Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein a generic example approach to blocking a back-reflection of an optical beam from interfering with the laser output beam, according to various embodiments, is illustrated. As shown, example approach 100 includes a quarter-wave plate (QWP) 106 to convert a linearly polarized mode optical beam from laser source 120 into a circularly polarized mode optical beam. For the illustrated embodiments, example approach 100 may further include a polarization rotator 104, in particular, a 45° rotator. In alternate embodiments, in lieu of the employment of a polarization rotator 104, QWP 106 and it axis may be disposed in a manner that is rotated, e.g., 45° rotated, relative to a polarization axis of the linearly polarized mode optical beam. In addition, an alternate embodiment may use a TE/TM converter instead of a true polarization rotator. In this embodiment, the optical output is a sum of quasi-TE and quasi-TM optical modes. Additionally, example approach 100 may also include a polarizer or polarizing beam splitter (PBS) 102.

For the illustrated embodiments, laser source (or simply laser) 120 is a laser source outputting a linearly polarized TE or quasi-TE mode optical beam 122a. QWP 106, and optionally polarization rotator (or TE/TM converter) 104 and polarizer or PBS 102 cooperate to transform a reflection of linearly polarized TE mode optical beam 122a into an orthogonal linearly polarized TM or quasi-TM mode optical beam 124, and isolate the linearly polarized TM mode optical beam 124 from linearly polarized TE mode optical beam 122a, to be described more fully below. Before doing so, it should be noted, in alternate embodiments, laser source 120 may be a TM laser source outputting a linearly polarized TM or quasi-TM mode optical beam. QWP 106, and optionally polarization rotator (or TE/TM converter) 104 and polarizer or PBS 102 cooperate to transform a reflection of the linearly polarized TM mode optical beam into an orthogonal linearly polarized TE or quasi-TE mode optical beam, and isolate the linearly polarized TE mode optical beam from the linearly polarized TM mode optical beam. Thus, the detailed description to follow, for ease of understanding, having laser source 120 described as a TE laser source is not to be read as limiting to the present disclosure. The disclosed apparatuses and methods apply equally with the laser source being a TM laser source outputting a linearly polarized TM mode optical beam.

Continuing to refer to FIG. 1, for the illustrated embodiments, during operation, TE laser source 120 generates a linearly polarized TE mode optical beam 122a. Linearly polarized TE mode optical beam 122a travels through TE polarizer or PBS 102 and reaching polarization rotator (or TE/TM converter) 104 as linearly polarized TE mode optical beam 122b. Polarization rotator (or TE/TM converter) 104 converts part of linearly polarized TE mode optical beam 122b to a TM mode and outputs a combination of linearly polarized TE and TM mode optical beam 122c. In particular, polarization rotator (or TE/TM converter) 104 converts part of linearly polarized TE mode optical beam 122b and outputs both TE and TM modes 122c with both orthogonal polarization components having a certain phase relationship between them which may be in phase or may be another fixed phase. Next, QWP 106 adds an additional phase delta to the combined TE and TM linearly polarized mode 122c components, such they have an additional quarter-wave shift between orthogonally polarized TE and TM components 122d.

On reflection, e.g., off reflecting element 108, which may be on-chip or off-chip, the combined quarter-wave shifted TE and TM polarized optical modes beam 122d with the opposite quarter-wave phase shift relationship, analogous to the reflection of a circularly polarized TE mode optical beam 122e with 45° polarization components in phase, circularly polarized in the opposite direction, e.g., clockwise circularly polarized. The reflected beam's orthogonal components may be quarter-wave shifted relative to each other, or may have a different relative phase to each other. QWP 106 converts the reflection 122e, which in bulk media would be again polarized in the opposite direction again and in planar optics may be a combination of quasi-TE and quasi-TM modes with a phase relationship which is a combination of their original phase difference, together with the quarter-wave shift originally introduced by the QWP, any shift from being reflected into linearly polarized modes optical beam 122f, except with the relative phase relation between orthogonal polarization components reverse due to the additional quarter-wave shift from passing back through the QWP (i.e. a combined π phase shift added to their original phase relationship when first emitted by the polarization rotator (or TE/TM converter) 104, such that the component which was phase-leading is now phase-lagging). Polarization rotator (or TE/TM converter) 104 combines the TE/TM components with their now reversed phase relationship 122f to output linearly polarized TM mode optical beam 124 (orthogonal to the original linearly polarized TE mode optical beam 122a. TE polarizer or PBS 102 in turn isolates linearly polarized TM mode optical beam 124 from linearly polarized TE mode optical beam 122a, keeping linearly polarized TM mode optical beam 124 from interfering with linearly polarized TE mode optical beam 122a (or keeping linearly polarized TM mode optical beam 124 from being absorbed by linearly polarized TE mode optical beam 122a). Resultantly, the linewidth of linearly polarized TE mode optical beam 122a may be preserved.

Figure 2:
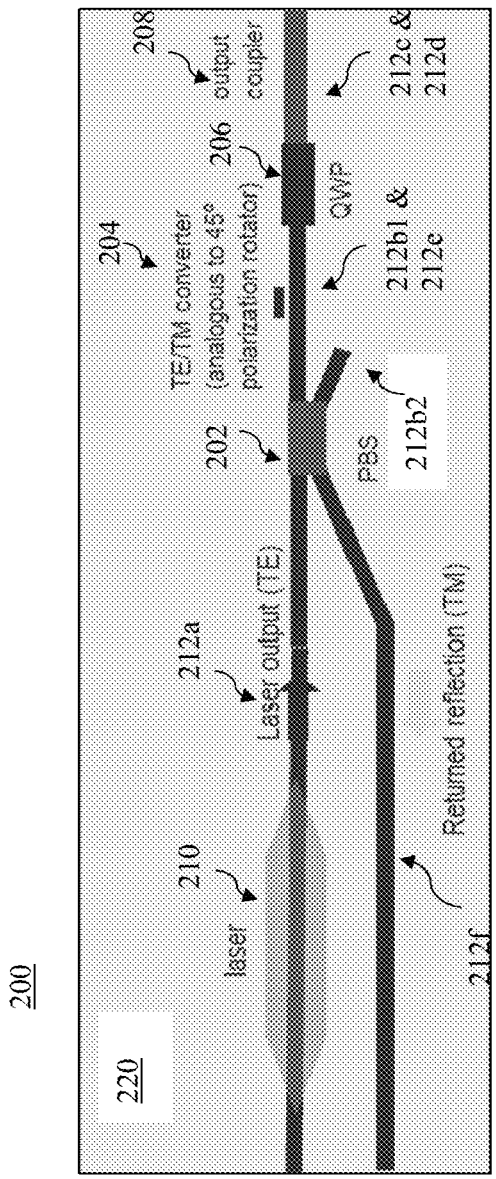
FIG. 2 illustrates an example silicon photonic chip employing an analogous approach to the example of FIG. 1 to re-route a back-reflection of an optical beam away from the source laser, according to various embodiments.

Referring now to FIG. 2, wherein an example silicon photonic chip employing an analogous approach of FIG. 1 to re-route a back-reflection of an optical beam away from the optical beam, according to various embodiments, is illustrated. Shown is a top view of an example silicon photonic chip 200, incorporated with an analogous approach of FIG. 1 to preserve the linewidth of the optical beam output by the on chip laser. Example silicon photonic chip 200 includes substrate 220. Further, example silicon photonic chip 200 includes laser source 210, PBS 202, polarization TE/TM converter 204, QWP 206 and output coupler 208, respectively disposed on substrate 220, and optically coupled to each other as shown. During operation, for the illustrated embodiments, laser source 210 generates a linearly polarized TE mode optical beam 212a. QWP 206, polarization TE/TM converter 204 and PBS 202 cooperate to transform a reflection of originally emitted linearly polarized TE mode optical beam 212a into an orthogonal linearly polarized TM mode optical beam 212f, and isolate the linearly polarized TM mode optical beam 212f and the linearly polarized TE mode optical beam 212a from each other. As noted earlier, in alternate embodiments, laser source 210 may output a linearly polarized TM mode optical beam instead. For these alternate embodiments, QWP 206, polarization TE/TM converter 204 and PBS 202 would cooperate to transform a reflection of the linearly polarized TM mode optical beam into an orthogonal linearly polarized TE mode optical beam, and isolate the linearly polarized TE mode optical beam and the original linearly polarized TM mode optical beam from each other. Again, the illustrated embodiments presented for ease of understanding are not to be construed to be limiting the present disclosure to where the original optical beam output by the on-chip laser is a linearly polarized TE mode optical beam. In particular, in alternate embodiments, the original optical beam output by the on-chip laser may be a linearly polarized TM mode optical beam.

Continuing to refer to FIG. 2, as linearly polarized TE mode optical beam 212a travels through PBS 202, optical beam 212a is split into linearly polarized TE mode optical beams 212b1 and 212b2. Next, polarization TE/TM converter 204 converts linearly polarized TE mode optical beam 212b1 into combined linearly polarized orthogonal TE and TM modes optical beam 212b1, with an initial phase relation between them. Then, QWP 206 adds quarter-wave (i.e., π/2) phase shift between the orthogonally polarized components of the beam 212b1 to produce a combination with additional quarter-wave phase shift optical beam 212c, analogous to a circularly polarized mode optical beam, e.g., counter-clockwise circularly polarized, in the generic example of FIG. 1.

On reflection off output coupler 208 or another reflecting element on-chip (or a target off-chip), quarter-wave-shifted polarized modes optical beam 212c becomes optical beam 212d, with reversed polarity, analogous to a circularly polarized TE mode optical beam being reflected circularly polarized in the opposite direction, e.g., clockwise circularly polarized, in the generic example of FIG. 1. QWP 106 converts the reflection 212d, into phase-shifted orthogonal TE and TM component modes optical beam 212e, except with polarization components having an additional 7C shift between components relative to their original phase relation 212b1. TE/TM converter 204 rotates the combined phase-shifted orthogonal modes optical beam 212e to output linearly polarized TM mode optical beam 212f, orthogonal to original linearly polarized TE mode optical beam 212a. PBS 202 in turn routes linearly polarized TM mode optical beam 212f away from linearly polarized TE mode optical beam 212a, keeping linearly polarized TM mode optical beam 212f from interfering with linearly polarized TE mode optical beam 212a. Resultantly, the linewidth of linearly polarized TE mode optical beam 212a may be preserved.

In various embodiments, split optical beam 212b2 may be routed to other circuitry, e.g., a photodiode (not shown) to sense its presence.

Figure 3:
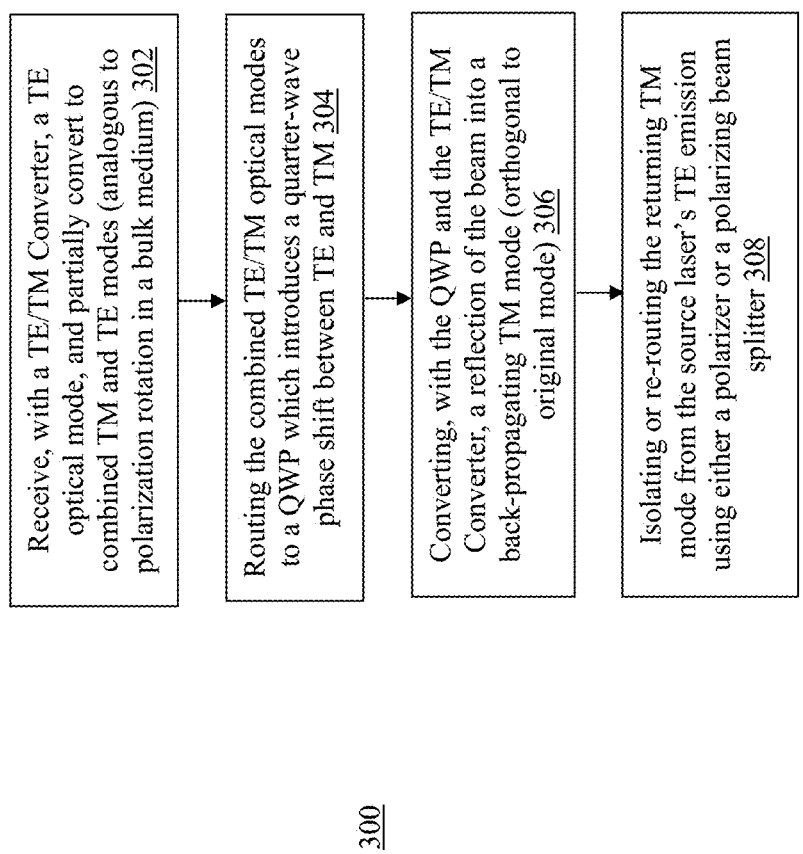
FIG. 3 illustrates an example process for routing, within a silicon photonic chip, a back-reflection of an optical beam away from the source laser, according to various embodiments.

Referring now to FIG. 3, wherein an example process for routing, within a silicon photonic chip, a back-reflection of an optical beam away from the optical beam, according to various embodiments, is illustrated. As shown, for the illustrated embodiments, process 300 for routing, within a silicon photonic chip, a back-reflection of an optical beam away from the optical beam includes operations performed at blocks 302-308. Process 300 will be described in the context of routing a back-reflection of a linearly polarized TE mode optical beam, in orthogonal TM mode, from the original linearly polarized TE mode optical beam. However, as noted earlier, process 300 is not so limiting. It applies equally to routing a back-reflection of a linearly polarized TM mode optical beam, in orthogonal TE mode, from the original linearly polarized TM mode optical beam.

Process 300 starts at block 302. At block 302, a linearly polarized transverse electric (TE) mode optical beam from a laser source disposed on a silicon photonic chip is received, with a polarization TE/TM converter disposed on the silicon photonic chip. The linearly polarized TE mode laser is partially converted to TM, with the polarization TE/TM converter, analogous to a 45° polarization rotator in bulk media. In various embodiments, the TE/TM converter may convert 50% of the incoming polarization to an orthogonal polarization, and the orthogonal polarization components may be in phase. In additional embodiments, the TE/TM converter may convert 50% of the incoming polarization to an orthogonal polarization, and the orthogonal polarization components may have a phase relation between them other than being in phase.

Next, at block 304, the combined TE and TM polarized modes are routed to a QWP disposed on the silicon photonic chip. The combined mode optical beam's relative phase between the orthogonal modes is converted, with the QWP, into a combination with an additional quarter-wave phase shift added to any pre-existing phase shift between them, analogous to a circularly polarized beam in bulk media, e.g., counter-clockwise circularly polarized.

At block 306, a reflection of the combined orthogonal modes optical beam, analogous to a circularly polarized beam in bulk media in the opposite circular direction, e.g., clockwise circularly polarized, is received, with the QWP. The reflection may be off a reflector on-chip or a reflector/target off-chip. The relative phase between the combined orthogonal modes is shifted by a quarter-wave, with the QWP, such that the orthogonal polarization components are now π shifted between components relative to their original phase relation when first produced by the TE/TM converter. Then, the combined optical beam is converted, with the TE/TM converter, into a linearly polarized TM mode optical beam.

Next, at block 308, with a TE polarizer or a PBS, the linearly polarized TM mode optical beam is routed away or isolated from the linearly polarized TM mode optical beam.

Figure 4:
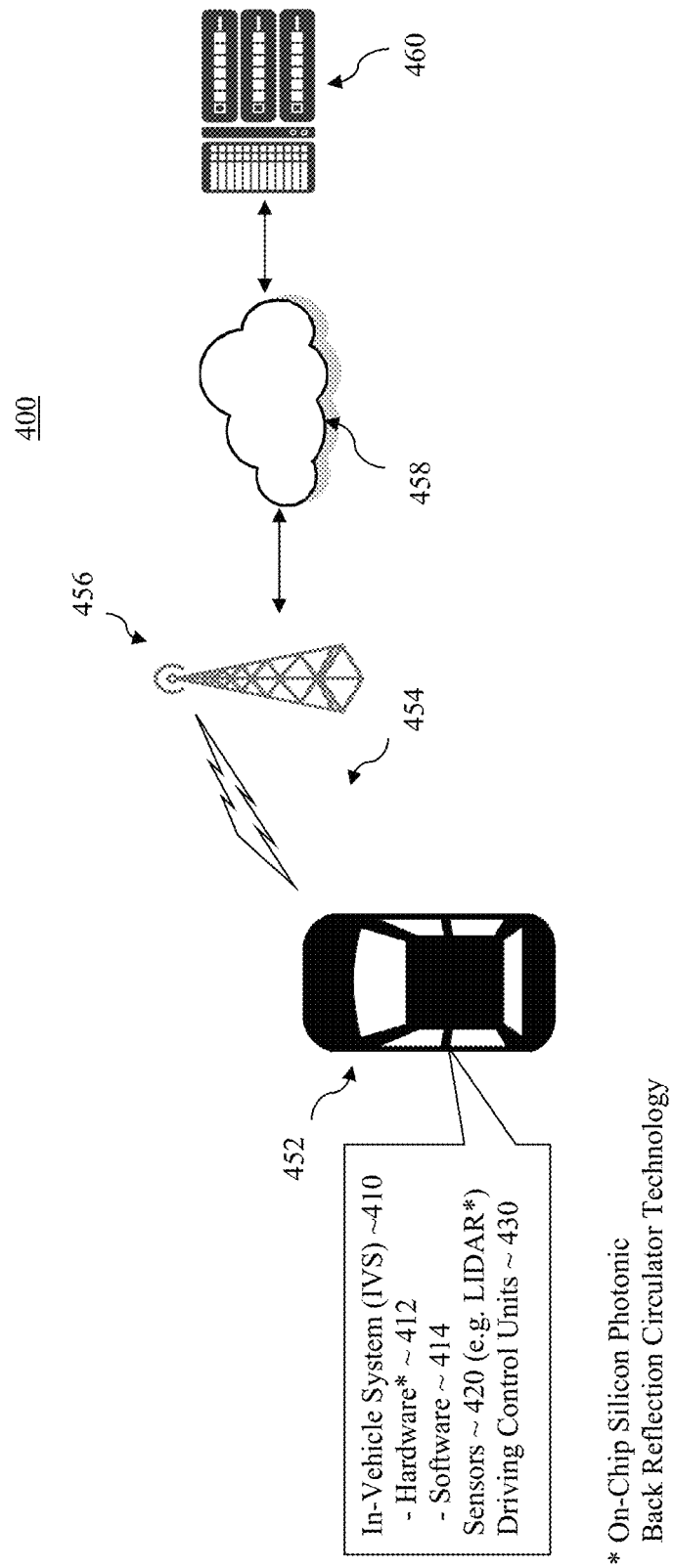
FIG. 4 illustrates an overview of an example environment for incorporating and using the silicon photonic chip back reflection protection/circulator technology of the present disclosure, in accordance with various embodiments.

Referring now to FIG. 4, wherein an overview of an example environment for incorporating and using the silicon photonic chip back reflection protection/isolation technology of the present disclosure, in accordance with various embodiments, is illustrated. As shown, for the illustrated embodiments, example environment 400 includes vehicle 452 having an engine, transmission, axles, wheels and so forth (not shown). Further, vehicle 452 includes in-vehicle system (IVS) 410, sensors 420 and driving control units (DCU) 430. IVS 410 includes hardware 412 and software 414 to host/implement a number of infotainment subsystems/applications, e.g., instrument cluster subsystem/applications, front-seat infotainment subsystem/application, such as, a navigation subsystem/application, a media subsystem/application, a vehicle status subsystem/application and so forth, and a number of rear seat entertainment subsystems/applications.

In some embodiments, sensors 420 are configured to provide various sensor data to IVS 410. Sensors 420 may include cameras (outward facing as well as inward facing), light detection and ranging (LiDAR) sensors, microphones, accelerometers, gyroscopes, inertia measurement units (IMU), engine sensors, drive train sensors, tire pressure sensors, and so forth. Driving control units 430 may include electronic control units (ECUs) that control the operation of the engine, the transmission the steering, and/or braking of vehicle 452.

Further, selected elements of hardware 412 (such as, certain intra-vehicle communication subsystems), and/or sensors 420 (such as LIDAR), include transceivers having silicon photonic chips, incorporated with the silicon photonic chip back reflection protection/isolation technology of the present disclosure. As earlier described, the lasers of these silicon photonic chips are protected from back-reflected light, with their linewidths preserved, and in turn, the accuracy of applications using the optical beams output by the lasers maintained.

In various embodiments, IVS 410, on its own or in response to the user interactions, may communicate or interact with one or more off-vehicle remote content servers 460, via a wireless signal repeater or base station on transmission tower 456 near vehicle 452, and one or more private and/or public wired and/or wireless networks 458. Examples of private and/or public wired and/or wireless networks 458 may include the Internet, the network of a cellular service provider, and so forth. It is to be understood that transmission tower 456 may be different towers at different times/locations, as vehicle 452 enroutes to its destination.

Figure 5:
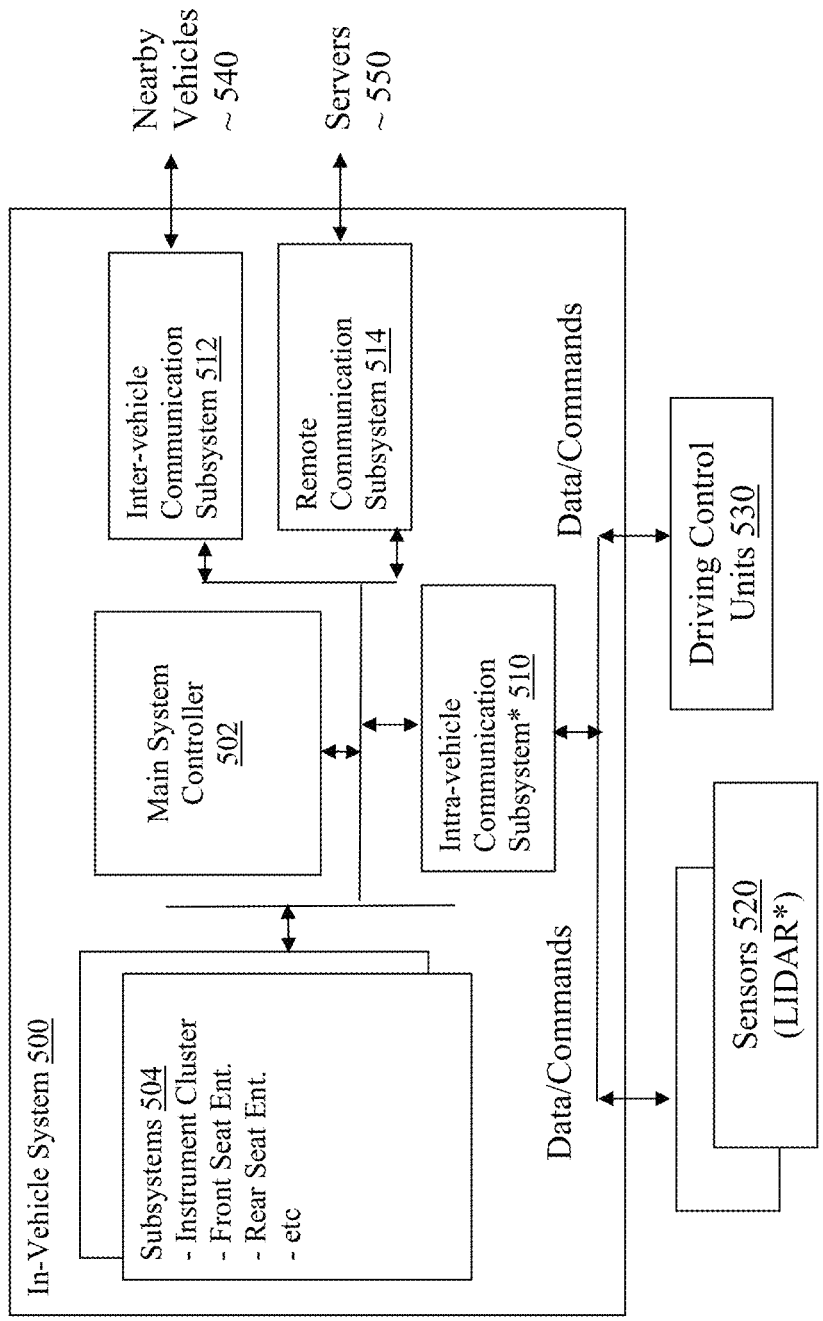
FIG. 5 illustrates a component view of an example in-vehicle system, according to various embodiments.

Referring now to FIG. 5, wherein a component view of an example in-vehicle system, according to various embodiments, is illustrated. As shown, for the illustrated embodiments, IVS 500 includes main system controller 502, various subsystems 504, intra-vehicle communication subsystem 510, inter-vehicle communication subsystem 512 and remote communication subsystem 514. In other embodiments, IVS 500 may include more or less subsystems. In some embodiments, IVS 500 may be IVS 410 of FIG. 4.

In some embodiments, main system controller 502 is configured to receive sensor data, via intra-vehicle communication subsystem 510, from sensors 520 of the vehicle, and operates the host vehicle (on which IVS 500 is disposed) accordingly. The sensor data may include, but are not limited to, sensor data (images) from one or more cameras of the vehicle providing frontal, rearward and/or side world views looking out the vehicle; sensor data from LIDAR, accelerometer, inertia measurement units (IMU), and/or gyroscopes of the vehicle, and so forth.

Subsystems 504 may include instrument cluster subsystems, front seat infotainment subsystems, rear-sear infotainment subsystems and so forth, and are configured to provide various operational data, and/or infotainment.

As alluded to earlier, intra-vehicle communication subsystem 510 is configured to facilitate intra vehicle communication with sensors 520 and driving control units 530 of the vehicles, as well as other sensors of e.g., mobile or wearable devices carried or worn by occupants of the vehicle. More specifically, intra-vehicle communication subsystem 510 is configured to receive data from sensors 520 and driving control units 530, and transmit commands to sensors 520 and driving control units 530. Example of commands to sensors 520 may include calibration commands, or commands to collect certain sensor data that are collected on demand (as opposed to being collected continuously). Example of commands to driving control units 530 may include but are not limited to, various operation commands to driving control units 530 controlling operations of the engine, the drive train, and/or the braking system of the vehicle.

In some embodiments, intra-vehicle communication subsystem 510 may be coupled with sensors 520 and driving control units 530 via a vehicle bus. Intra-vehicle communication subsystem 510 may communicate with sensors 520 and driving control units 530 in accordance with the Controller Area Network communication protocol. In some embodiments, intra-vehicle communication subsystem 510 may be communicatively coupled with other sensors via a wireless network, and communicate in accordance with a wireless network protocol, such as Near Field Communication (NFC), Bluetooth®, WiFi and so forth.

Inter-vehicle communication subsystem 512 is configured to facilitate communication with nearby vehicles 540. In some embodiments, inter-vehicle communication subsystem 512 is configured to support inter-vehicle communication in accordance with one or more industry accepted practices. In some embodiments, inter-vehicle communication subsystem 512 may be configured to communicate with communication subsystems of the other vehicles via WiFi or cellular, such as LTE 4G/5G.

Remote communication subsystem 514 is configured to facilitate communication with one or more remote servers 550, which may be server 460 of FIG. 4. In some embodiments, remote communication subsystem 514 may be configured to communicate with servers 550 wirelessly, via a wide area network, such as the Internet. Wireless communication may be WiFi or cellular, such as LTE 4G/5G.

In some embodiments, each of main system controller 502, subsystems 504, intra-vehicle communication subsystem 510, inter-vehicle subsystem 512, and remote communication subsystem 514 may be implemented in hardware, software or combination thereof. Example hardware implementations may include by are not limited to application specific integrated circuit (ASIC) or programmable circuits (such as Field Programmable Gate Arrays (FPGA)) programmed with the operational logic. Software implementations may include implementations in instructions of instruction set architectures (ISA) supported by the target processors, or any one of a number of high level programming languages that can be compiled into instruction of the ISA of the target processors. In particular, in some embodiments, at least intra-vehicle subsystem 510 and/or sensors 520 include one or more transceivers having silicon photonic chips incorporated with the silicon photonic chip back reflection protection/circulator technology of the present disclosure.

Figure 6:
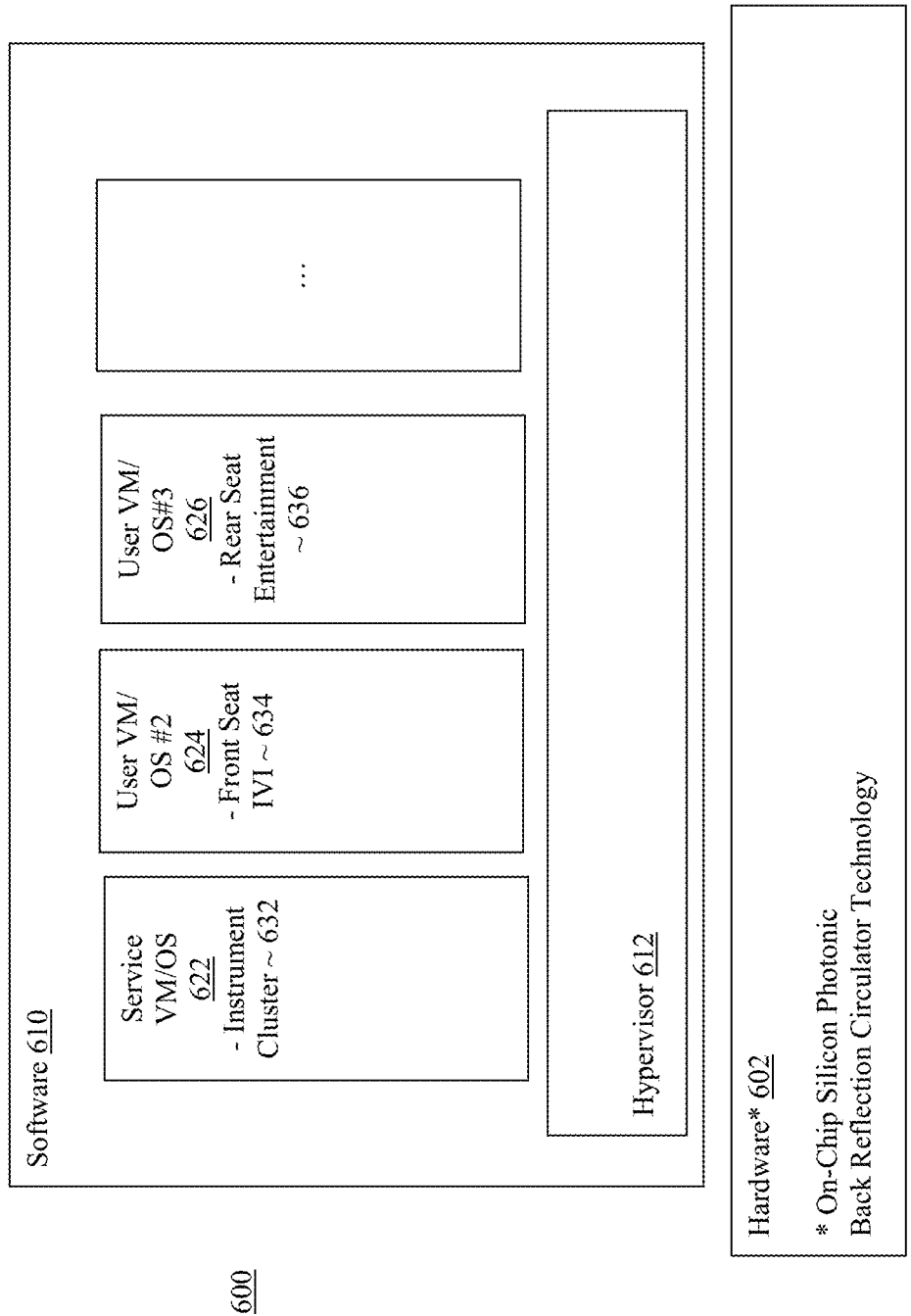
FIG. 6 illustrates a software component view of an in-vehicle system having the silicon photonic chip back reflection protection/circulator technology of the present disclosure, according to various embodiments.

Referring now to FIG. 6, wherein a software component view of the in-vehicle system, according to various embodiments, is illustrated. As shown, for the embodiments, IVS system 600, which could be IVS system 410 or 500, includes hardware 602 and software 610. Hardware 602 includes one or more components having transceivers with silicon photonic chips incorporated with the silicon photonic chip back reflection protection/circulator technology of the present disclosure. Software 610 includes hypervisor 612 hosting a number of virtual machines (VMs) 622-626. Hypervisor 612 is configured to host execution of VMs 622-626. The VMs 622-626 include a service VM 622 and a number of user VMs 624-626. Service machine 622 includes a service OS hosting execution of a number of instrument cluster applications 632. User VMs 624-626 may include a first user VM 624 having a first user OS hosting execution of front seat infotainment applications 634, and a second user VM 626 having a second user OS hosting execution of rear seat infotainment applications 636, and so forth.

Elements 612-636 of software 610 may be any one of a number of these elements known in the art. For example, hypervisor 612 may be any one of a number of hypervisors known in the art, such as KVM, an open source hypervisor, Xen, available from Citrix Inc, of Fort Lauderdale, Fla., or VMware, available from VMware Inc of Palo Alto, Calif., and so forth. Similarly, service OS of service VM 622 and user OS of user VMs 624-626 may be any one of a number of OS known in the art, such as Linux, available e.g., from Red Hat Enterprise of Raliegh, N.C., or Android, available from Google of Mountain View, Calif.

Figure 7:
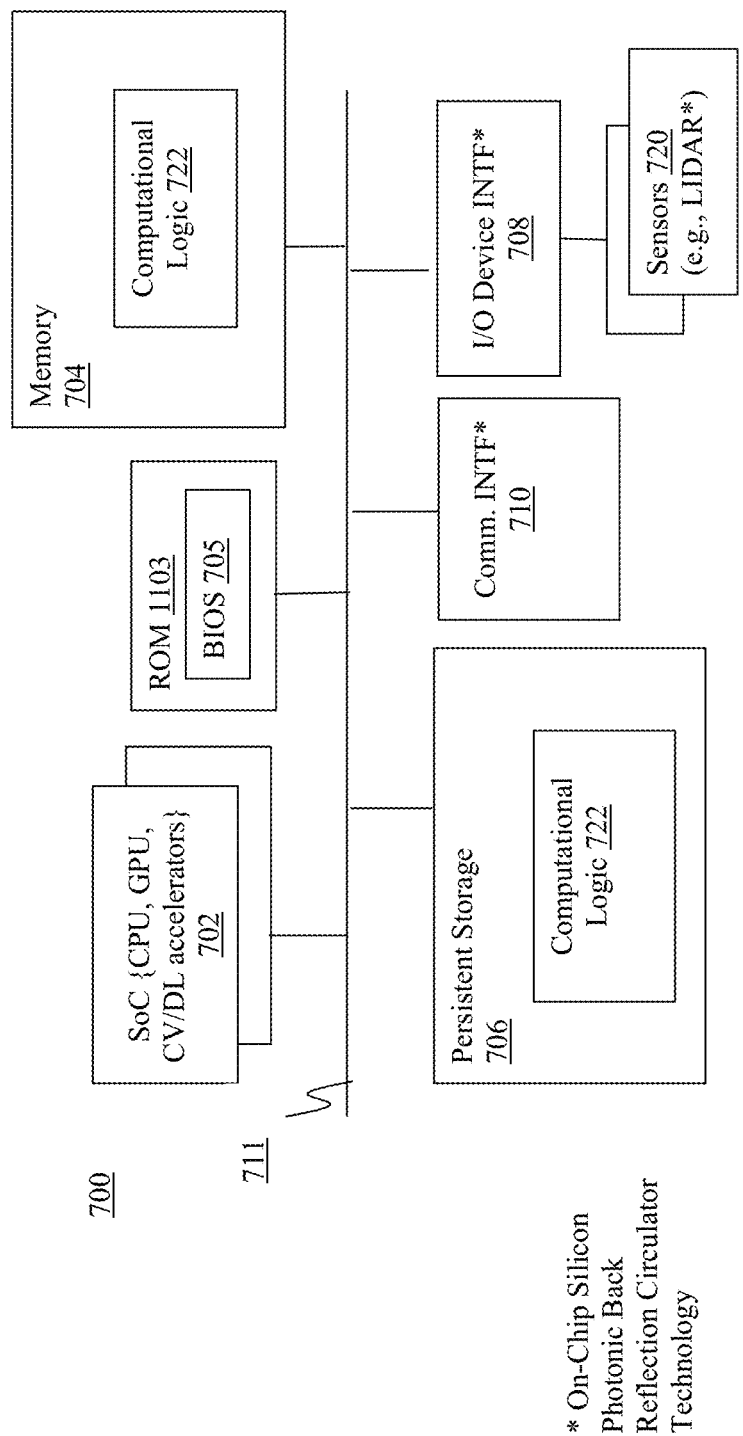
FIG. 7 illustrates a hardware component view of the in-vehicle system having the silicon photonic chip back reflection protection/circulator technology of the present disclosure, according to various embodiments.

Referring now to FIG. 7, wherein an example computing platform that may be suitable for use to practice the present disclosure, according to various embodiments, is illustrated. As shown, computing platform 700, which may be hardware 602 of FIG. 6, may include one or more system-on-chips (SoCs) 702, ROM 703 and system memory 704. Each SoCs 702 may include one or more processor cores (CPUs), one or more graphics processor units (GPUs), one or more accelerators, such as computer vision (CV) and/or deep learning (DL) accelerators. ROM 703 may include basic input/output system services (BIOS) 705. CPUs, GPUs, and CV/DL accelerators may be any one of a number of these elements known in the art. Similarly, ROM 703 and BIOS 705 may be any one of a number of ROM and BIOS known in the art, and system memory 704 may be any one of a number of volatile storage known in the art.

Additionally, computing platform 700 may include persistent storage devices 1106. Example of persistent storage devices 706 may include, but are not limited to, flash drives, hard drives, compact disc read-only memory (CD-ROM) and so forth. Further, computing platform 700 may include one or more input/output (I/O) interfaces 708 to interface with one or more I/O devices, such as sensors 720. Other example I/O devices may include, but are not limited to, display, keyboard, cursor control and so forth. Computing platform 700 may also include one or more communication interfaces 710 (such as network interface cards, modems and so forth). Communication devices may include any number of communication and I/O devices known in the art. Examples of communication devices may include, but are not limited to, networking interfaces for Bluetooth®, Near Field Communication (NFC), WiFi, Cellular communication (such as LTE 4G/5G) and so forth. The elements may be coupled to each other via system bus 711, which may represent one or more buses. In the case of multiple buses, they may be bridged by one or more bus bridges (not shown).

Each of these elements may perform its conventional functions known in the art. In particular, ROM 703 may include BIOS 705 having a boot loader. System memory 704 and mass storage devices 706 may be employed to store a working copy and a permanent copy of the programming instructions implementing the operations associated with hypervisor 612, service/user OS of service/user VM 622-626, and/or various components of an IVS (such as main system controller 502, subsystems 504 and/or 510-514), collectively referred to as computational logic 722. The various elements may be implemented by assembler instructions supported by processor core(s) of SoCs 702 or high-level languages, such as, for example, C, that can be compiled into such instructions.

In various embodiments, at least one of communication interface 710, I/O device interface 708, and/or sensor 720 includes a transceiver having a silicon photonic chip incorporated with the back reflection protection/circulator technology to redirect or otherwise isolate a reflection of a linearly polarized mode optical beam output by an on-chip laser from interfering with the linearly polarized mode optical beam.

Thus various example embodiments of the present disclosure have been described including, but are not limited to:

Example 1 is an apparatus for optical communication or sensing, comprising: a quarter wave plate (QWP) disposed on a silicon photonic chip to convert a first linearly polarized mode optical beam from a laser disposed on the silicon photonic chip, into a combination of quarter-wave phase-delayed orthogonal polarization modes optical beam, and to convert or contribute in converting a reflection of the combined polarized modes optical beam into a second linearly polarized mode optical beam, within the silicon photonic chip; wherein the optical beam's polarization axes are rotated relative to an axis of the QWP, or the QWP and its axis are rotated relative to a polarization axis of the optical beam.

Example 2 is example 1, further comprising a polarization transverse electric/transverse magnetic (TE/TM) converter disposed on the silicon photonic chip to receive from the laser, the first linearly polarized optical mode optical beam, and convert part of the optical power of the first linearly polarized optical mode optical beam to an orthogonally linearly polarized mode; wherein the QWP is coupled to the polarization TE/TM converter to receive the partially converted first linearly polarized mode optical beam; phase-delay one polarization component of the optical beam to generate the combination of quarter-wave phase-delayed orthogonal polarization modes optical beam; and wherein the QWP is to further subsequently receive the reflection of the combination of quarter-wave phase-delayed orthogonal polarization modes optical beam, and cooperate with the polarization TE/TM converter in converting the reflection of the combination of quarter-wave phase-delayed orthogonal polarization modes into the second linearly polarized mode optical beam.

Example 3 is example 2, wherein the polarization TE/TM converter is a 50% converter, arranged to receive the first linear polarized mode optical beam and convert half of its optical power to the orthogonal polarization mode, where the combined linear polarization modes optical beam are in phase or have another fixed phase.

Example 4 is example 3, wherein the QWP adds a quarter-wave phase delay between the combined linear polarization modes.

Example 5 is example 4, wherein the reflection of the combination of quarter-wave phase-delayed orthogonal polarization optical beam, add additional phase-shift of a half wavelength or other phase shift between orthogonal polarization components.

Example 6 is example 5, wherein the QWP converts the reflection of the combination of quarter-wave phase-delayed orthogonal polarization optical beam with additionally phase-shift into a third combination of linearly polarized modes optical beam, with polarization components π-shifted relative to their original phase shift when first emitted by the TE/TM converter.

Example 7 is example 6, wherein the TE/TM converter converts the third combination of linearly polarized modes optical beam, with its polarization components π-shifted relative to their original state, to output the second linearly polarized mode optical beam, with orthogonal polarization mode to the first linearly polarized mode optical beam.

Example 8 is example 2, further comprises a polarizer or a polarizing beam splitter (PBS), disposed between the laser and the polarization TE/TM converter on the silicon photonic chip; wherein the polarizer or PBS receives and isolates the second linearly polarized mode optical beam from the first linearly polarized mode optical beam.

Example 9 is example 8, wherein the apparatus comprises the silicon photonic chip having the laser, the polarization TE/TM converter, the QWP and the PBS.

Example 10 is example 9, wherein the apparatus comprises a transceiver having the silicon photonic chip.

Example 11 is example 10, wherein the apparatus comprises a Light Detection and Ranging sensor having the transceiver.

Example 12 is a method for optical communication or sensing, comprising: receiving from a laser disposed on a silicon photonic chip, a linearly polarized transverse electric (TE) mode optical beam, with a polarization TE/transverse magnetic (TM) converter disposed on the silicon photonic chip; converting some of the linearly polarized TE mode optical beam, with the polarization TE/TM converter, into an orthogonal polarization, to produce a combined linearly polarized modes optical beam; routing the combined linearly polarized modes optical beam to a quarter wave plate (QWP) disposed on the silicon photonic chip, and with the QWP, converting the combined linearly polarized modes optical beam into a combined linearly polarized modes optical beam with additional wave shift between orthogonal modes optical beam; converting, with the QWP and the polarization TE/TM converter, a polarized reflection of the combined linearly polarized modes optical beam with additional wave shift between orthogonal modes optical beam, into a linearly polarized transverse magnetic (TM) mode optical beam; and isolating or re-routing, with a TE polarizer or a polarizing beam splitter, the linearly polarized TM mode optical beam.

Example 13 is example 12, wherein receiving comprises receiving the linearly polarized TE mode beam with a 50% polarization TE/TM converter, and converting comprises converting, with the 50% polarization TE/TM converter, half of the linearly polarized TE mode optical beam, where the linearly polarized TE mode and the orthogonal mode are in phase or have some other fixed phase between them.

Example 14 is example 13, wherein converting, with the QWP, the combined linearly polarized modes optical beam comprises delaying, with the QWP, one of the orthogonal components by a wave offset in addition to any incident phase delay between them.

Example 15 is example 14, wherein the reflection of the combined linearly polarized modes optical beam with additional wave offset between orthogonal modes optical beam, is converted, with the QWP, into a combination of linearly polarized optical modes optical beam, with orthogonal polarization components of the linearly polarized reflection being shifted between components relative to their initial phase-relation when first emitted by the TE/TM converter.

Example 16 is example 15, wherein converting further comprises coupling, with the polarization TE/TM converter, the combined phase-offset polarized reflection optical beam, with its polarization components having an additional shift between components, to output the TM mode optical beam.

Example 17 is an in-vehicle system comprising: a main system controller disposed in a computer-assisted or autonomous driving (CA/AD) vehicle; an intra-vehicle communication subsystem disposed in the CA/AD vehicle; and a plurality of sensors in the CA/AD vehicle; wherein at least one of the intra-vehicle communication subsystem or the plurality of sensors includes a silicon photonic chip having a laser to output a linearly polarized mode optical beam, wherein the silicon photonic chip further includes a transverse electric/transverse magnetic (TE/TM) converter, a quarter wave plate (QWP), and a selected one of a polarizer or a polarizing beam splitter (PBS), arranged to isolate a reflection of the linearly polarized mode optical beam from the linearly polarized mode optical beam, within the silicon photonic chip.

Example 18 is example 17, wherein the linearly polarized mode optical beam is a first linearly polarized mode optical beam; wherein the polarization rotator receives from the laser, the first linearly polarized mode optical beam, and partially convert optical power of the first linearly polarized mode optical beam to produce a combined linearly polarized modes optical beam; wherein the QWP receives the combined linearly polarized modes optical beam, and converts the combined linearly polarized modes optical beam into a combined linearly polarized modes optical beam with additional quarter-wave shift between orthogonal modes optical beam; and wherein the QWP and polarization TE/TM converter are to further cooperate to output a second linearly polarized mode optical beam, based at least in part on a reflection of the combined linearly polarized modes optical beam with additional quarter-wave shift between orthogonal modes optical beam.

Example 19 is example 18, wherein the polarizer or the PBS receives and isolates the second linearly polarized mode optical beam from the first linearly polarized mode optical beam.

Example 20 is example 17, wherein the plurality of sensors include a Light Detection and Ranging sensor having a transceiver having the silicon photonic chip.

Example 21 is example 17, wherein the intra-vehicle communication subsystem includes a transceiver having the silicon photonic chip.

The silicon photonic chip back reflection protection/circulator technology described herein provides a means to block back-reflections from reaching the on-chip source laser in a LIDAR or optical transceiver chip. Because it does not require active or magnetooptic components, it retains the CMOS compatibility advantage of silicon photonics together with no additional electrical power dissipation. This renders it advantageous for both silicon photonic LIDAR and transceiver chips to maintain high laser spectra purity.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for optical communication or sensing, comprising:
a quarter wave plate (QWP) disposed on a silicon photonic chip to convert a first linearly polarized mode optical beam from a laser disposed on the silicon photonic chip into a combination of quarter-wave phase-delayed orthogonal polarization modes optical beam, and to convert or contribute in conversion of a reflection of the combined polarized modes optical beam into a second linearly polarized mode optical beam, within the silicon photonic chip;
wherein polarization axes of the polarized mode optical beam's are rotated relative to an axis of the QWP, or the QWP and its axis are rotated relative to a polarization axis of the optical beam.

2. The apparatus of claim 1, further comprising:
a polarization transverse electric/transverse magnetic (TE/TM) converter disposed on the silicon photonic chip to receive, the first linearly polarized optical mode optical beam from the laser, and convert part of an optical power of the first linearly polarized optical mode optical beam to an orthogonally linearly polarized mode, wherein:
the QWP is coupled to the polarization TE/TM converter to receive the partially converted first linearly polarized mode optical beam, phase-delay one polarization component of the optical beam to generate the combination of quarter-wave phase-delayed orthogonal polarization modes optical beam, and
the QWP is to subsequently receive the reflection of the combination of quarter-wave phase-delayed orthogonal polarization modes optical beam, and cooperate with the polarization TE/TM converter in converting the reflection of the combination of quarter-wave phase-delayed orthogonal polarization modes into the second linearly polarized mode optical beam.

3. The apparatus of claim 2, wherein the polarization TE/TM converter is a 50% converter, arranged to receive the first linearly polarized mode optical beam and convert half of its optical power to the orthogonal polarization mode, where the combined linear polarization modes optical beam are in phase or have another fixed phase.

4. The apparatus of claim 3, wherein the QWP adds a quarter-wave phase delay between the combined linear polarization modes.

5. The apparatus of claim 4, wherein the reflection of the combination of quarter-wave phase-delayed orthogonal polarization optical beam add additional phase-shift of a half wavelength or other phase shift between orthogonal polarization components.

6. The apparatus of claim 5, wherein the QWP converts the reflection of the combination of quarter-wave phase-delayed orthogonal polarization optical beam with additionally phase-shift into a third combination of linearly polarized modes optical beam, with polarization components $\pi$-shifted relative to their original phase shift when first emitted by the TE/TM converter.

7. The apparatus of claim 6, wherein the TE/TM converter converts the third combination of linearly polarized modes optical beam, with its polarization components $\pi$-shifted relative to their original state, to output the second linearly polarized mode optical beam, with orthogonal polarization mode to the first linearly polarized mode optical beam.

8. The apparatus of claim 2, further comprises a polarizer or a polarizing beam splitter (PBS), disposed between the laser and the polarization TE/TM converter on the silicon photonic chip; wherein the polarizer or PBS receives and isolates the second linearly polarized mode optical beam from the first linearly polarized mode optical beam.

9. The apparatus of claim 8, wherein the apparatus comprises the silicon photonic chip having the laser, the polarization TE/TM converter, the QWP, and the PBS.

10. The apparatus of claim 9, wherein the apparatus comprises a transceiver having the silicon photonic chip.

11. The apparatus of claim 10, wherein the apparatus comprises a Light Detection and Ranging sensor having the transceiver.

12. A method for optical communication or sensing, comprising:
receiving, from a laser disposed on a silicon photonic chip, a linearly polarized transverse electric (TE) mode optical beam, with a polarization TE/transverse magnetic (TM) converter disposed on the silicon photonic chip;
converting some of the linearly polarized TE mode optical beam, with the polarization TE/TM converter, into an orthogonal polarization, to produce a combined linearly polarized modes optical beam;
routing the combined linearly polarized modes optical beam to a quarter wave plate (QWP) disposed on the silicon photonic chip, and with the QWP, converting the combined linearly polarized modes optical beam into the combined linearly polarized modes optical beam with additional wave shift between orthogonal modes optical beam;
converting, with the QWP and the polarization TE/TM converter, a polarized reflection of the combined linearly polarized modes optical beam with additional wave shift between orthogonal modes optical beam, into a linearly polarized transverse magnetic (TM) mode optical beam; and
isolating or re-routing, with a TE polarizer or a polarizing beam splitter, the linearly polarized TM mode optical beam.

13. The method of claim 12, wherein receiving comprises receiving the linearly polarized TE mode beam with a 50% polarization TE/TM converter, and converting comprises converting, with the 50% polarization TE/TM converter, half of the linearly polarized TE mode optical beam, where the linearly polarized TE mode and the orthogonal mode are in phase or have some other fixed phase between them.

14. The method of claim 13, wherein converting, with the QWP, the combined linearly polarized modes optical beam comprises delaying, with the QWP, at least one orthogonal component by a wave offset in addition to any incident phase delay between them.

15. The method of claim 14, wherein the reflection of the combined linearly polarized modes optical beam with additional wave offset between orthogonal modes optical beam is converted, with the QWP, into the combination of linearly polarized optical modes optical beam, with orthogonal polarization components of the linearly polarized reflection being shifted between components relative to their initial phase-relation when first emitted by the TE/TM converter.

16. The method of claim 15, wherein converting further comprises coupling, with the polarization TE/TM converter, the combined phase-offset polarized reflection optical beam, with its polarization components having an additional shift between components, to output the TM mode optical beam.

17. An in-vehicle system comprising:
a main system controller disposed in a computer-assisted or autonomous driving (CA/AD) vehicle;
an intra-vehicle communication subsystem disposed in the CA/AD vehicle; and
a plurality of sensors in the CA/AD vehicle;
wherein at least one of the intra-vehicle communication subsystem or the plurality of sensors includes a silicon photonic chip having a laser to output a linearly polarized mode optical beam, wherein the silicon photonic chip further includes a transverse electric/transverse magnetic (TE/TM) converter, a quarter wave plate (QWP), and a selected one of a polarizer or a polarizing beam splitter (PBS), arranged to isolate a reflection of the linearly polarized mode optical beam from the linearly polarized mode optical beam, within the silicon photonic chip.

18. The in-vehicle system of claim 17,
wherein the linearly polarized mode optical beam is a first linearly polarized mode optical beam;
wherein a polarization rotator receives the first linearly polarized mode optical beam from the laser, and partially converts optical power of the first linearly polarized mode optical beam to produce a combined linearly polarized modes optical beam;
wherein the QWP receives the combined linearly polarized modes optical beam, and converts the combined linearly polarized modes optical beam into the combined linearly polarized modes optical beam with additional quarter-wave shift between orthogonal modes optical beam; and
wherein the QWP and polarization TE/TM converter are to further cooperate to output a second linearly polarized mode optical beam, based at least in part on a reflection of the combined linearly polarized modes optical beam with additional quarter-wave shift between orthogonal modes optical beam.

19. The in-vehicle system of claim 18, wherein the polarizer or the PBS receives and isolates the second linearly polarized mode optical beam from the first linearly polarized mode optical beam.

20. The in-vehicle system of claim 17, wherein the plurality of sensors include a Light Detection and Ranging sensor having a transceiver having the silicon photonic chip.

21. The in-vehicle system of claim 17, wherein the intra-vehicle communication subsystem includes a transceiver having the silicon photonic chip.

* * * * *

UNITED STATES PATENT AND TRADEMARK OFFICE
CERTIFICATE OF CORRECTION

PATENT NO. : 11,353,882 B2  
APPLICATION NO. : 16/145747  
DATED : June 7, 2022  
INVENTOR(S) : Jonathan K. Doylend Page 1 of 1

It is certified that error appears in the above-identified patent and that said Letters Patent is hereby corrected as shown below:

In the Claims

Column 14  
Line 33, In Claim 1, "... , and to convert ..." should read - "... , and convert ..."  
Line 38, In Claim 1, "... optical beam's are ..." should read - "... optical beam are ..."  
Line 44, In Claim 2, "... receive, the ..." should read - "... receive the ..."  
Line 51, In Claim 2, "... , phase-delay ..." should read - "... , a phase-delay ..."

Column 15  
Line 57, In Claim 12, "... beam, into ..." should read - "... beam into ..."

Signed and Sealed this  
Sixth Day of September, 2022

Katherine Kelly Vidal  
*Director of the United States Patent and Trademark Office*